Dec. 5, 1950 G. M. ETNYRE 2,532,544
BRAKE CONTROLLED ACCELERATOR LINKAGE
Filed July 24, 1948
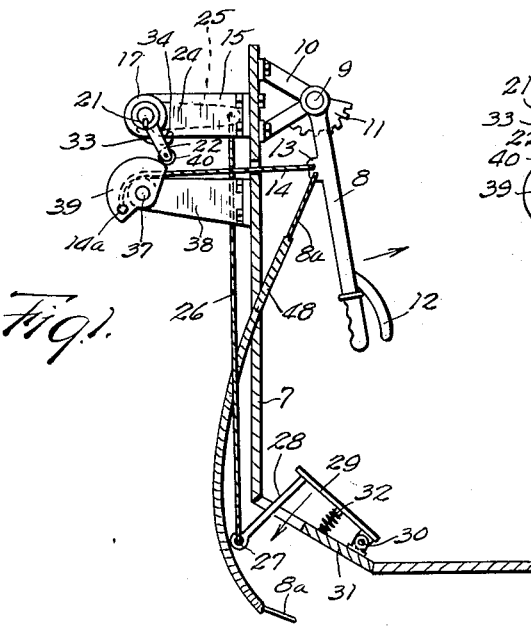
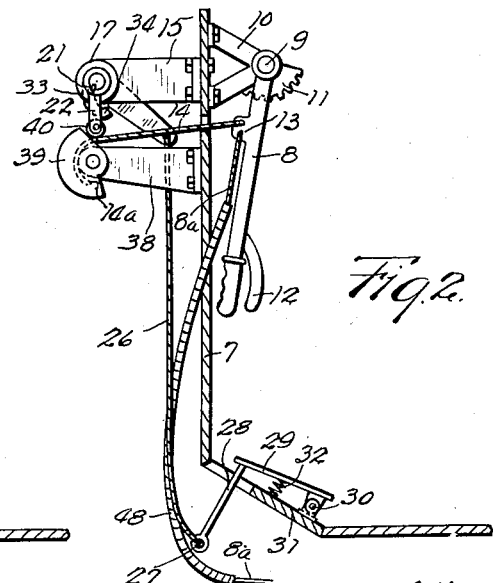
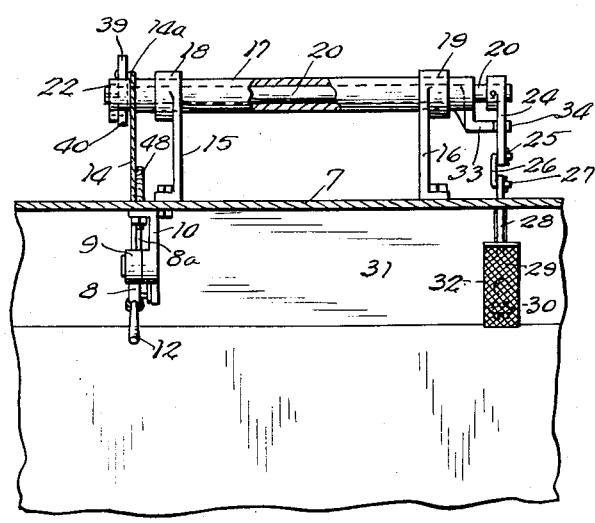
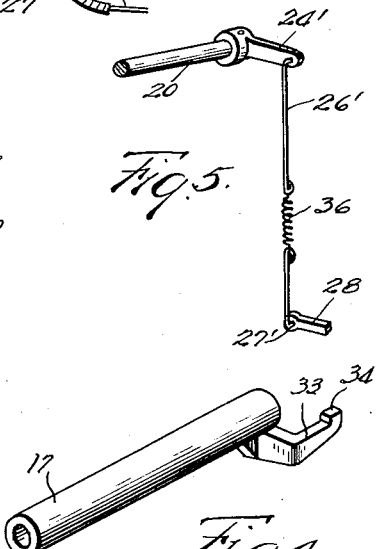
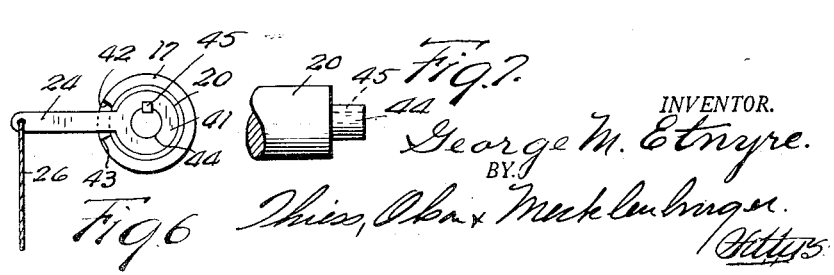
INVENTOR.
George M. Etnyre.
BY
Thiess, Olson & Mecklenburger Patented Dec. 5, 1950

2,532,544

UNITED STATES PATENT OFFICE 2,532,544

BRAKE CONTROLLED ACCELERATOR LINKAGE

George M. Etnyre, Oregon, Ill.

Application July 24, 1948, Serial No. 40,578

8 Claims. (Cl. 192—3)

The present invention relates to improvements in automotive vehicles and concerns itself particularly with limiting the operation of the accelerating mechanism of such automotive vehicles whenever the emergency or parking brake thereof is not completely released or "off."

Automotive vehicles of various types, such as those driven by gasoline or Diesel engines, as well as those propelled by electric motors, such as street cars and "trolley buses," are usually provided with so-called emergency or parking brakes, which serve to keep the vehicle from being set in motion when at rest such as by being pushed by another vehicle or as a result of gravity when standing on an incline. In ordinary motor cars this is almost invariably accomplished by providing a so-called emergency or parking brake, provided with a hand operated lever usually capable of being locked in position when the brake is on, or as it is termed "set."

It frequently happens that the operator of a vehicle will drive it some distance with the brake at least partially on without his knowledge. Obviously, this rapidly wears out the brake mechanism and is a strain on the motor and other parts of the vehicle.

Various means for preventing this have been attempted, such as the use of visual or audible signals which are actuated when the emergency brake is on. Such means are frequently more detrimental than beneficial, as they produce a false sense of security. If there is a failure in the bulb or other signal mechanism or in the circuit thereof, no warning will result although the brake is set partially. Under such circumstances the operator, noting the absence of any signal, is satisfied that the brake is completely off, and therefore he is more likely to overlook some drag caused by the brake.

The present invention is designed to overcome these disadvantages by making it substantially impossible to accelerate the engine at all or to any appreciable extent when the brake is set even partially.

In the case of the usual foot accelerator pedal means are provided for preventing or closely limiting the depression of the accelerator pedal with the brake on, which prevents any normal operation of the vehicle. However, provision is made for sufficient acceleration to start the engine, or to start the vehicle on an incline, this requiring the application of undue force. However, the effort required is such as to definitely warn the operator that the brake is not in the off position.

The present invention has for its object to provide means to prevent the operation of a vehicle when the emergency or parking brake is fully or partially set so that this brake will not be unnecessarily worn out by the deliberate operation of the vehicle while dragging such a brake.

A further object of the present invention is to provide means for preventing or limiting the operation of the accelerator mechanism of an automotive vehicle whenever the parking or emergency brake is not completely released.

Still another object is to provide means of the above described type for preventing operation of the accelerator mechanism of a vehicle except to a limited extent by the application of unusual force.

Other objects of the present invention will become apparent from the further description herein when considered in connection with the drawing which is made part hereof, and in which:

Fig. 1 is a side elevational view, partially in section, of a construction for practicing the present invention in connection with a vehicle provided with a parking brake and an accelerator pedal, the figure showing the device in the position where the brake is wholly or partially set and the accelerator pedal limited as to its movement;

Fig. 2 is a similar view to Fig. 1, but showing the brake in the fully released position;

Fig. 3 is a top plan view, partially in section, of the device shown in Figs. 1 and 2;

Fig. 4 is a perspective view of one part of a stop that may be employed in the present construction for limiting movement of the accelerator means;

Fig. 5 is a perspective view, showing a modified type of mechanism for permitting limited movement of the accelerator mechanism;

Fig. 6 is an end view of a modified form of limiting construction; and

Fig. 7 is a side elevational view of a portion of the shaft shown in Fig. 6.

In order to describe the general principles of the invention it is shown in connection with the usual floor-board type of accelerator mechanism and the emergency or parking brake mechanism of an ordinary automotive vehicle such as a car, truck or trolley bus. Thus there is provided, on the dask 7 of such a vehicle, the operating handle 8 of an emergency or parking brake, said lever being pivoted at the point 9 on a pivot which is supported on the dash 7 by means of the brackets 10.

The usual type of pawl and ratchet mechanism 11 is provided so that the brake lever, when pulled to the right as shown in Fig. 1, will be locked in position by the engagement of a pawl with one of the notches in the ratchet mechanism 11. A release lever 12 is provided for releasing the pawl from the ratchet to allow the brake lever to assume the position shown in Fig. 2.

A brake-operating cable 8a is secured to an ear 13 on the brake lever 8 and may pass through a hollow flexible shaft 48 shown as passing through the dash 7. A bracket 38 secured to the frontal side of the dash 7 supports a short shaft 37 carrying a cam 39 keyed thereto. A cable 14 is attached to the cam 39 at 14a, its other end being secured to the ear 13 on brake lever 8, so that when the brake lever is moved the shaft 37 and cam 39 will be moved.

Also attached to the dash 7 are spaced supporting brackets 15 and 16 (Fig. 3) which support a rigid tubular shaft 17, shown in greater detail in the perspective view of Fig. 4. The tubular shaft 17 is rotatably secured in bearings 18 and 19 on the brackets 15 and 16, respectively. Rotatably mounted within the tubular shaft 17 is a solid torque-transmitting shaft 20 which may extend somewhat beyond the end of the tubular shaft 17. The two shafts 17 and 20 are keyed to each other at the left end as viewed in Fig. 3 by means of the key 21, so that they will partake of the same rotational movement. To effect said movement there is keyed to the shafts 17 and 20 a crank arm 22, provided with a roller 40 that contacts the cam 39. The periphery of cam 39 is circular so that, when the brake-lever is pulled towards braking position to partially or completely set the brake, it will move the lever 22 into the position shown in Fig. 1, but when the brake is completely released it will allow the lever 22 to assume the position in which it is shown in Fig. 2.

To the shaft 20, which in the construction as shown in Figs. 1 and 2, extends beyond the end of the hollow shaft 17, there is rigidly keyed a second crank arm 24 oriented in a position at an angle to the crank arm 22. Secured to crank arm 24 is an operating cable 26 which is connected with the eye 27 of the lever 28 which in turn is rigidly secured to the accelerator pedal 29. The accelerator pedal 29 is hingedly mounted by means of the hinge 30 to a portion 31 of the toe-board of the vehicle. A suitable spring 32 serves to bias the accelerator pedal 29 to the upper position so that after being depressed by the foot of the operator it will, upon the removal of the pressure, return substantially to the position shown in Fig. 1. The accelerator pedal 29 is shown in a depressed position in Fig. 2.

The hollow shaft 17 is also provided with a rigidly thereto attached stop-arm 33 having an upwardly projecting portion 34, which latter is so positioned as to leave a slight amount of space between the crank arm 24 and the end of the upwardly projecting portion 34 of the stop-arm 33, the purposes of which will be further explained hereinbelow.

The operation of the device is substantially as follows:

When the brake lever 8 has been pulled to the right as shown in Fig. 1, it will normally set the brakes of the vehicle to a greater or lesser extent, depending upon the amount of movement of the lever. At the same time, by reason of the motion imparted to the crank arm 22 as the result of the rotation of the shaft 37 and contact of roller 40 with cam 39, crank arm 22 will have assumed an inclined position as shown in Fig. 1, therefore causing the second crank arm 24 to assume a substantially horizontal position, at which time the cable 26 attached to the lever 28 of the accelerator pedal 29 will be taut and will therefore prevent the depression of the accelerator pedal except upon the application of relatively great force.

Now, in connection with automotive vehicles employing internal combustion engines, it is often necessary to depress the accelerator pedal somewhat in order to open the throttle far enough to enable the vehicle to be started if cold. It is for this reason that the space is provided between the crank arm 24 and the upwardly extending portion 34 of the stop-arm 33. In other words, the natural flexibility of the solid shaft 20 is taken advantage of to permit depression of the pedal to an extent corresponding to the space between the portion 34 and the crank lever 24.

However, further movement is prevented once the crank arm 24 has abutted against the portion 34, as the larger hollow shaft 17 has sufficient resistance to distortion to prevent further movement of the accelerator pedal.

Therefore, while it will be possible to start the engine, the engine can not be operated at a high enough speed to furnish sufficient output of energy to move the vehicle except at extremely low speeds and normally may cause stalling of the motor. Therefore, an operator would at once be apprised of the fact that the parking brake was still wholly or even partially on and he would therefore have to release the brake completely so as to place the mechanism into the position shown in Fig. 2, thereby permitting the vehicle to be operated normally.

As shown in Fig. 2, the lever 8 has now been released entirely, therefore allowing the crank arm 22 to assume a substantially vertical position, also thereby bringing the second lever 24 into a downwardly directed position. This slackens the cable 26, permitting the accelerator pedal 29 to be depressed to any desired extent so that the vehicle may now be operated in the normal manner.

It will be appreciated that provisions could be made to lock the accelerator pedal completely against movement, but this would therefore prevent the starting of the motor. As this, however, is only necessary in connection with internal combustion engines, but not necessary with electrically operated motors, the device may be so set that the abutment 34 will be in direct contact with the crank arm 24 at all times, in which case there will of course be no lost motion between the two parts as is provided for in connection with the above description so as to allow limited movement for starting purposes.

Illustrated in Fig. 5 is an alternative means for providing limited movement of the accelerator pedal without making use of the hollow shaft 17. This comprises a shaft designated in Fig. 5 by the reference numeral 20', to the end of which there is attached a crank arm 24'. A cable 26' connects the crank arm 24' to the eye 27' of a lever 28' attached to an accelerator pedal. However, somewhere along the extent of the cable 26', there is inserted a heavy duty spring 36 so that even when the brake is on and the cable 26' is taut, it will still be possible, by exerting sufficient force, to depress the accelerating pedal against the force of the spring 36. However, this condition will immediately make the operator of the vehicle aware of the fact that the parking brake is still wholly or partially on, and he will therefore release it so that the accelerator pedal may be operated to its full extent.

Still another form of construction permitting limited movement of the accelerator mechanism is shown in Figs. 6 and 7 and is somewhat similar to that shown in Figs. 1–3.

In the construction shown in Figs. 6 and 7 shaft 20 is provided with a reduced end portion 44 and the sleeve or hollow shaft 17 extends to the end of the shaft 20 and has a slot or cut-out portion 42 in the end thereof. The lever 24 is provided with a collar 41 for fitting over the reduced end 44 of shaft 20, a key 45 serving to hold the collar in place on the shaft with the lever 24 projecting through the slot 42 of shaft 17. Thus, when the brake is on, lever 24 may move due to twisting of the shaft 20 until it engages the side 43 of slot 42, when further movement is prevented.

While various constructions have been disclosed, all of them provide means for preventing operation of the vehicle when the parking or emergency brake has not been entirely released.

It is again to be emphasized that only such portions of the mechanism have been illustrated as are necessary for an understanding of the broad general principles of the invention, and that the exact shape and organization of the various parts is open to considerable variation within the skill of the workers in this art. Moreover, the present invention may be combined with other types of brake levers such as those which operate with a straight pull in connection with various types of pawl and ratchet mechanisms.

Accordingly applicant claims:

1. A safety mechanism to prevent driving of an automotive vehicle when its parking and emergency brake is not completely released which comprises the combination of a brake-lever, means connecting said lever with the parking and emergency brake of said vehicle, actuating means comprising a crank arm operatively connected with said lever and two concentric torque-transmitting members rigidly connected at one end to said crank arm but with the free ends thereof capable of limited movement relative to each other, the free end of one of said transmitting members being connected by means of a cable with the accelerator pedal of said vehicle to permit only slight movement thereof when the brake is not completely released but permitting full movement when the brake is fully released.

2. The combination with an automotive vehicle having a brake lever operatively connected with a parking brake and an accelerator pedal, of mechanism to prevent driving said vehicle when said parking brake is not substantially completely released, comprising a crank arm operatively connected with said brake lever, a rotatable tubular shaft fixedly connected at one end to said arm, a second shaft in said tubular shaft fixedly connected at its corresponding end to said crank arm, a second crank arm fixed to the free end of one of said shafts, means connecting said second arm to said accelerator pedal, and means associated with said shafts for limiting relative rotation of said shafts to a predetermined extent.

3. The combination with an automotive vehicle having a brake lever operatively connected with a parking brake and an accelerator pedal, of mechanism to prevent driving said vehicle when said parking brake is not substantially completely released, comprising a crank arm operatively connected with said brake lever, a rotatable tubular shaft fixedly connected at one end to said arm, a second shaft in said tubular shaft fixedly connected at its corresponding end to said crank arm and having a second crank arm fixed to its free end, means connecting said second arm to said accelerator pedal, and means associated with said outer tubular shaft for limiting rotation of said inner shaft to a predetermined extent.

4. The combination with an automotive vehicle having a brake lever operatively connected with a parking brake and an accelerator pedal, of mechanism to prevent driving said vehicle when its parking brake is not substantially released, comprising a crank arm, a rotatable tubular shaft fixedly connected at one end to said arm, a second shaft in said tubular shaft fixedly connected at its corresponding end to said crank arm and having a second crank arm fixed to its free end, means connecting said second arm to said accelerator pedal, cam means operatively connected to said brake lever positioned to actuate said first crank arm upon movement thereof, and stop means associated with said tubular shaft for limiting rotation of said inner shaft to a predetermined extent.

5. The combination with an automotive vehicle having a brake lever operatively connected with a parking brake and an accelerator pedal, of mechanism to prevent driving said vehicle when its parking brake is not substantially released, comprising a tubular shaft mounted for rotation, a crank arm fixedly connected to one end of said shaft, a second shaft in said tubular shaft fixedly connected at its corresponding end to said crank arm and having a second crank arm fixed to its free end, cam means operatively connected to said brake lever positioned to actuate said first crank arm upon movement thereof, means connecting said second crank arm to said accelerator pedal, said inner shaft being sufficiently resilient to yield somewhat to rotational force upon the application of unusual pressure to said accelerator pedal, and stop means associated with said tubular shaft for limiting rotation of said inner shaft to a predetermined extent.

6. The construction as claimed in claim 5 in which the stop means for limiting rotation of said inner shaft is a notch of predetermined size in the end of the outer hollow shaft through which said second crank shaft extends.

7. The construction as claimed in claim 5 in which the stop means for limiting rotation of said inner shaft is a stop on the outside of the tubular shaft positioned to be engaged by said second crank arm.

8. The combination with an automotive vehicle having a brake lever operatively connected with a parking brake and an accelerator pedal, of mechanism to prevent driving said vehicle when its parking brake is not substantially released, comprising a tubular shaft mounted for rotation, a crank arm fixedly connected to one end of said shaft, a second shaft in said tubular shaft fixedly connected at its corresponding end to said crank arm and having a second crank arm fixed to its free end, cam means operatively connected to said brake lever positioned to actuate said first crank arm upon movement thereof, a cable connecting said second crank arm to said accelerator pedal of a length to raise said pedal upon braking movement of said brake lever, said inner shaft being sufficiently resilient to yield somewhat to rotational force upon the application of unusual pressure to said accelerator pedal, and stop means associated with said tubular shaft for limiting rotation of said inner shaft to a predetermined extent.

GEORGE M. ETNYRE.

REFERENCES CITED

The following references are of record in the file of this patent:

UNITED STATES PATENTS

| Number | Name | Date |
|---|---|---|
| 2,169,949 | Haupt | Aug. 15, 1939 |
| 2,229,056 | Dick | Jan. 21, 1941 |

FOREIGN PATENTS

| Number | Country | Date |
|---|---|---|
| 290,646 | Great Britain | May 31, 1928 |